GENERAL PURPOSE MAJORITY-DECISION LOGIC ARRAYS

Filed May 9, 1962 2 Sheets-Sheet 1

INVENTOR
MARIUS COHN
BY Marvin Jacobson
ATTORNEY

GENERAL PURPOSE MAJORITY-DECISION LOGIC ARRAYS

Filed May 9, 1962 2 Sheets-Sheet 2

| n | FIG. 1 $X_1$ | $X_2$ | $X_3$ | $X_4$ | fn | FIG. 2 $X_1$ | $X_2$ |
|---|---|---|---|---|---|---|---|
| 1 | 0 | 0 | 0 | 0 | 0 | 0 | 0 |
| 2 | 0 | 0 | 0 | 1 | $A \cdot \bar{B}$ | A | 0 |
| 3 | 0 | 0 | 1 | 0 | $\bar{A} \cdot \bar{B}$ | 0 | $\bar{A}$ |
| 4 | 0 | 0 | 1 | 1 | $\bar{B}$ | A | $\bar{A}$ |
| 5 | 0 | 1 | 0 | 0 | $A \cdot B$ | 0 | A |
| 6 | 0 | 1 | 0 | 1 | A | A | A |
| 7 | 0 | 1 | 1 | 0 | $A \cdot B + \bar{A} \cdot \bar{B}$ | 0 | 1 |
| 8 | 0 | 1 | 1 | 1 | $A + \bar{B}$ | A | 1 |
| 9 | 1 | 0 | 0 | 0 | $\bar{A} \cdot B$ | $\bar{A}$ | 0 |
| 10 | 1 | 0 | 0 | 1 | $\bar{A} \cdot B + A \cdot \bar{B}$ | 1 | 0 |
| 11 | 1 | 0 | 1 | 0 | $\bar{A}$ | $\bar{A}$ | $\bar{A}$ |
| 12 | 1 | 0 | 1 | 1 | $\bar{A} + \bar{B}$ | 1 | $\bar{A}$ |
| 13 | 1 | 1 | 0 | 0 | B | $\bar{A}$ | A |
| 14 | 1 | 1 | 0 | 1 | $A + B$ | 1 | A |
| 15 | 1 | 1 | 1 | 0 | $\bar{A} + B$ | $\bar{A}$ | 1 |
| 16 | 1 | 1 | 1 | 1 | 1 | 1 | 1 |

Fig. 6

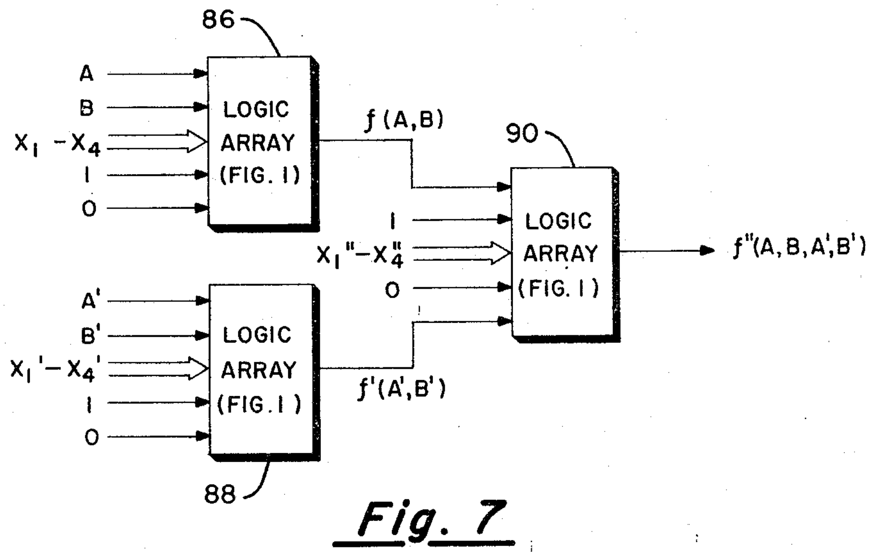

Fig. 7

INVENTOR
MARIUS COHN
BY Marvin Jacobson
ATTORNEY

United States Patent Office 3,296,424

Patented Jan. 3, 1967

3,296,424

GENERAL PURPOSE MAJORITY-DECISION LOGIC ARRAYS

Marius Cohn, Minneapolis, Minn., assignor, by mesne assignments, to the United States of America as represented by the Secretary of the Navy Filed May 9, 1962, Ser. No. 196,028
2 Claims. (Cl. 235—152)

This invention relates generally to data processing devices and more specifically to data processing devices which incorporate majority-decision logic circuits to perform the data processing operations.

For the purposes of the following specification and the appended claims a majority-decision logic circuit is defined as a circuit which in response to an odd number of coincident input signal representations of binary values will output a signal representing a binary value in accordance with the majority of the input signals. Describing this with an example using the majority-decision logic circuit which is utilized in the embodiment of the instant invention and which will be described subsequently in greater detail, a three input majority-decision logic circuit will develop an output signal representing a binary 0 if at least two of the input signals are representative of binary 0's and if at least two of the inputs are of a binary 1 representation the developed output signal will accordingly be representative of a binary 1.

It has been found that majority-decision logic circuits can be utilized advantageously in lieu of the commonly used AND-OR logic circuits to perform the same logic function with a saving in hardware and a decrease in operational time. For example, copending application by Cohn et al., Serial No. 131,281, filed August 14, 1961, and assigned to the same assignee of the instant application describes majority-decision carry-net or comparator systems for use in data processing devices. A further copending application, Serial No. 128,879, filed August 2, 1961, by Luke also describes a comparator utilizing a majority-decision logic circuit.

The present day trend in the manufacture and assembly of the data processing devices is toward the modular concept. Briefly, it can be stated that this concept involves the use of a basic logical building block as the basic modular element and by properly interconnecting a plurality of these basic building blocks the required logical functions to be performed during the data processing operation can be selectively obtained. This results in manufacturing efficiency and in ease of maintenance, particularly when the basic building block structure is a pluggable unit which can be readily inserted or removed as required. With the realization of the advantages in using majority-decision logic circuits it becomes necessary to adapt these circuits to the modular concept. Therefore, it is an object of this invention to provide a general purpose logical array incorporating majority-decision logic circuits to be utilized as the basic logical building block for data processing devices.

It is a further object of this invention to provide a basic logical building block incorporating majority-decision logic circuits which can selectively develop signal representation of the logical function of a plurality of logical input variables.

In the general case, the embodiment of this invention includes means for receiving a signal representation of the binary value of a pair of independent variables in addition to a plurality of control signals which control the selection of the desired logical function output. The control signals may be developed independently, such as from the control section of a digital computer or, alternatively, at least some of the control signals may be a function of one or both of the independent variable inputs. In the former case the logical function output is completely controlled by some external means whereas in the latter case the logical function output is dependent upon the input variable. Therefore, it is a further object of this invention to provide a general purpose logical building block incorporating majority-decision logic circuits in which the logical function output is controlled independent of the logical signal input.

Yet another object of this invention is to provide a logical building block incorporating majority-decision logic circuits in which the logical function of the output signal is selectively controlled by the logical function input signals.

These and other more detailed and specific objects will be disclosed in the course of the following specification, reference being had to the accompanying drawings, in which:

FIG. 6 is a tabular listing of the possible Boolean function output signal with two independent logical input variables along with the conditions required to effect said output signal in each of the embodiments of FIG. 1 and FIG. 2;

FIG. 7 shows an exemplary interconnection of the logical elements of this invention as utilizable in a data processing device.

Figure 1:
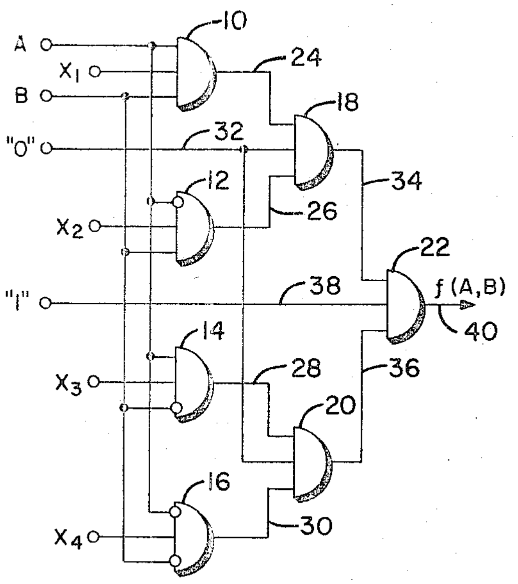
FIG. 1 is one exemplary embodiment of the instant invention.
Figure 4:
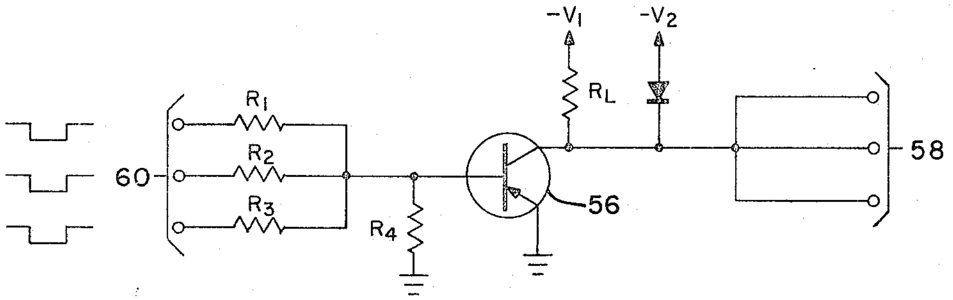
FIG. 4 is an electrical schematic of a majority-decision logic circuit which is utilizable in the instant invention.

Preceding the detailed explanation of the operation of the instant invention it is beneficial to aid in the understanding of the operation to define terms and some of the symbology utilized. Each of the semicircular symbols, such as 10 in FIG. 1, represents a three input majority-decision logic circuit. Typical electrical circuitry of these elements is shown in FIG. 4 and will be subsequently described in greater detail. The input signals to each of the majority-decision logic circuits are applied to the straight side thereof and the output appears at the curved side. In the array of elements shown in FIG. 1 the direction of signal propagation through the array is indicated by the orientation of the element symbols as being from left to right.

At the input to some of the elements the small circular symbols indicate that the signal applied thereto is a negation or complement of the signal. In other words, the signal input A which is applied to the majority-decision logic element 12 in FIG. 1 functionally is a NOT A signal, symbolically represented as $\overline{A}$, as represented by the circle at the input of element 12. Although obviously an inverting circuit could be placed between the A signal input line 14 and the input to element 12, since FIG. 1 is intended to show the logical interconnection of the array elements the circular symbol indicating complementation is utilized.

In the general case, the logical function output signal from each of the majority-decision logic elements can be represented by (1) $$f = A \# B \# C$$

In words this equation states that the output function signal $f$ is in accord with the majority of the input signals A, B, and C; where A, B, and C are each binary valued signal representations of 1 or 0. In the course of the following description, further definitions will be made as required.

Referring now to FIG. 1 there are shown three sets of majority-decision logic elements representing respectively three levels of logic. The first set which performs the lowest level of logic operation comprises elements 10, 12, 14 and 16; the intermediate level of logic is performed by the second set of elements 18 and 20; and the highest level of logic is performed by the third set of elements, logical element 22. A function of the independent variable logical inputs, A and B, is applied as a first input to each of the logical elements in the first set. A and B are binary valued signals and the inputs are signal representations of the corresponding binary value. The signal representation of A provides a first input to logical elements 10 and 14 while signal representations of $\bar{A}$, the negate or complement of A, are applied as first inputs to elements 12 and 16 of the first set. Signal representations of the binary value of B are applied as a second input to logical elements 10 and 12, while signal representations of $\bar{B}$ are applied as second inputs to logical elements 14 and 16. The control signals, preferably derived from an external control section, labeled $X_1$, $X_2$, $X_3$ and $X_4$, are respectively applied as the third input signal to elements 10, 12, 14 and 16. These control signals can be selectively set, by means not shown, to a signal representation of a binary 1 or a binary 0. As will be subsequently described in greater detail the determination of whether the respective control signals should be 1's or 0's is dependent upon the desired logical function output signal from the array of FIG. 1.

In the second set of logical elements the output signal developed by element 10 appearing on line 24 provides a first input to element 18 and the output signal from element 12 provides a second input to element 18 via line 26. Element 20 receives a first input from the output of element 14 via line 28 and a second input from element 16 via line 30. The third input to each of the elements in the second set, elements 18 and 20, is a constant signal representation of a binary 0 appearing on line 32. The signal element 22 comprising the third set of logic elements receives a first input from logic element 18 via line 34, a second input from logic element 20 via line 36 and a third input of a constant signal representation of a binary 1 via line 38. The logical function output signal developed by the array appears on the output of logical element 22 on the line 40. The label of $f$(A,B) indicates that the array output signal is a function of A and B, the two independent variable input signals. The general expression representing the array output signals, as derived by use of the basic Equation 1 above, is (2) $f_{(A,B)}=[(A\#X_1\#B)\ \#\ 0\ \#\ (\bar{A}\#X_2\#B)]$ $$f_{18}=(A\#X_1\#B)\ \#\ 0\ \#\ (\bar{A}\#X_2\#B)$$

This equation represents the general expression for the sixteen possible Boolean logic functions resulting from two independent variable logic inputs. The derivation of this equation can be pointed out by describing a portion of the derivation and the remainder of the derivation will be obvious therefrom. The output signal from element 10 in FIG. 1 on line 24 is expressed by $$f_{10}=A\ \#\ X_1\ \#\ B$$

and the output signal from element 12 appearing on line 26 is expressed by $$f_{12}=\bar{A}\ \#\ X_2\ \#\ B$$

These two signals provide two of the inputs to logic element 18 and the third input thereto is equal to a constant of binary 0 on line 32. The output signal from element 18 appearing on line 34 is therefore represented by $$f_{18}=(A\#X_1\#B)\ \#\ 0\ \#\ (\bar{A}\#X_2\#B)$$

This latter expression can be seen to be one of the terms of the general Expression (2) above, since it is one of the inputs to the highest level logic element 22 from which the array output signal is derived.

Referring now to the table of FIG. 6, the left-hand column labeled $n$ provides a decimal item number for each of the sixteen possible Boolean logical functions. In the column labeled $f_n$ are listed the Boolean logical function signals which can be outputted by the array. Under the column headed FIG. 1, the binary value to which the control signals, $X_1$—$X_4$, should be respectively set to provide the corresponding logic function output signal, $f_n$, are shown. The binary values for $X_1$—$X_4$ can be substituted into the general Equation (2) above and by algebraic operation the corresponding logical function can be derived. As an example, referring to the line labeled $n$12 which corresponds to $f_n$ equal to NOT A or NOT B (represented as $\bar{A}+\bar{B}$), $X_1$, $X_2$, $X_3$ and $X_4$, are respectively set to binary values of 1011. Substituting these binary values for $X_1$—$X_4$, in the general equation above, results in the following equation:

(3)

$$f_{12n}=\left[\underset{(A\#1\#B)}{a}\ \#\ 0\ \#\ \underset{(\bar{A}\#0\#B)}{b}\right]\ \#\ 1\ \#\ \left[\underset{(A\#1\#\bar{B})}{c}\ \#\ 0\ \#\ \underset{(\bar{A}\#1\bar{B}\#)}{d}\right]$$

By grouping certain of the portions of the latter equation respectively as shown as $a$, $b$, $c$ and $d$, and by utilization of the following Truth Table 1, the Boolean equivalents or identities for each of the respective groups are determined.

Truth Table 1

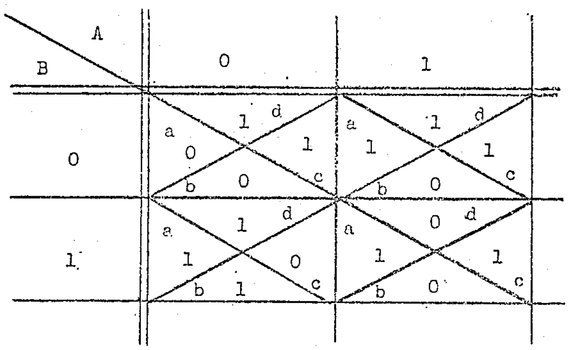

From the above Truth Table 1 it can be seen that the Boolean equivalents are:

$$a\equiv A+B$$
$$b\equiv\bar{A}\cdot B$$
$$c\equiv A+\bar{B}$$
$$d\equiv\bar{A}+\bar{B}$$

where + represents OR and · represents AND.

The next step in the algebraic operation is to substitute these latter four Boolean equivalents for the respective groupings of Equation (3) above to result in:

Parts of Equation (4) in turn, can be grouped together as shown respectively labeled $a'$ and $b'$ and again by use of Truth Table 2 the Boolean identity can be determined as follows:

Truth Table 2

| B \ A | 0 | 1 |
|---|---|---|
| 0 | b' 1 / a' 0 | b' 1 / a' 0 |
| 1 | b' 0 / a' 1 | b' 0 / a' 0 |

From this latter Truth Table 2, it can be seen that the Boolean equivalents are:

$$a' \equiv \bar{A} \cdot B$$
$$b' \equiv \bar{B}$$

Substitution of these latter two Boolean identities into Equation (4) results in:

$$f_{12} = (\bar{A} \cdot B) \# 1 \# \bar{B} \qquad (5)$$

The final step is taken using Truth Table 3 for Equation (5) as follows:

Truth Table 3

| B \ A | 0 | 1 |
|---|---|---|
| 0 | 1 | 1 |
| 1 | 1 | 0 |

$$f_{12} = \bar{A} + \bar{B}$$

which is as shown in the table of FIG. 6 as the corresponding array output signal. Obviously, the proof of the development of the other fifteen possible Boolean functions as shown in the table of FIG. 6 can be done in the same manner as described in the above example. In the manner described, therefore, the array of FIG. 1 having two independent variable logic signals of A and B will selectively provide an output signal which is any one of the sixteen possible Boolean functions by the proper setting of the four control signals.

Figure 2:
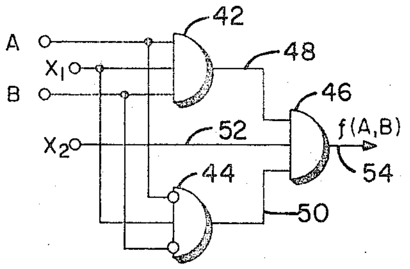
FIG. 2 is another exemplary embodiment of the instant invention.

The array of FIG. 2 includes only two sets of majority-decision logic elements for two levels of logic, the first set containing elements 42 and 44 and the second set containing element 46. The signal representations of independent variable logical input signals are again labeled A and B and the control signal inputs are $X_1$ and $X_2$. The three input signals to element 42 of the first set are A, B, and $X_1$ and the three inputs to element 44 of the first set are $\bar{A}$, $\bar{B}$ and $X_1$. The output signal from element 42 of the first set appearing on line 48 provides a first input to logic element 46 and the output signal developed by element 44 provides a second input to element 46 while the third input to element 46 is the control signal $X_2$ appearing on line 52. The array output signal is outputted from element 46 and appears on line 54 and again is labeled $f_{(A,B)}$, a function of the two input signals A and B. By proper selective setting of the control signals $X_1$ and $X_2$ of FIG. 2, in some instances as constants, in other instances as functions of at least one of the input variable signals and in still other instances as a combination of constants and functions of one of the input signals, the array of FIG. 2 will develop an array output signal which will be any one of the sixteen possible Boolean functions.

This can be seen again with reference to FIG. 6 which lists the required settings for the control signals in the right-hand column to effect an array output signal which is the corresponding Boolean function $f_n$ for the array of FIG. 2. In the same manner as described relative to FIG. 1 the general equation for the output signal of the array of FIG. 2 can be derived as:

$$f_{(A,B)} = (A \# X_1 \# B) \# X_2 \# (\bar{A} \# X_1 \# \bar{B}) \qquad (6)$$

Figure 3:
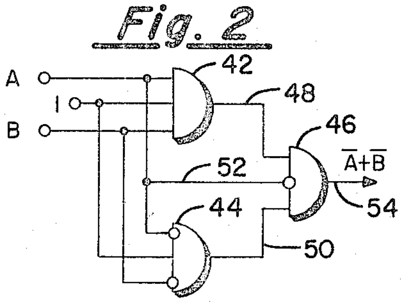
FIG. 3 is an exemplary particular adaptation of the embodiment shown in FIG. 2, in accordance with one of the listings in the table of FIG. 6.

In FIG. 3 there is shown an adaptation of the general array of FIG. 2 to provide one of the specific Boolean function outputs of the table of FIG. 6. Specifically, the array of FIG. 3 is connected such as to provide the output signals of $\bar{A}+\bar{B}$, the same example utilized relative to the description of FIG. 1. Reference to the table of FIG. 6 at the line $n12$ shows that to effect this array output signal the input control signals $X_1$ and $X_2$ should respectively be set to 1, and $\bar{A}$. The parts of FIG. 3 corresponding to those of FIG. 2 are similarly labeled. It can be seen that the three inputs to element 42 are respectively A, B, and 1, while the three inputs to element 44 are respectively $\bar{A}$, $\bar{B}$ and 1. Two of the inputs to element 46 are the same as they were in FIG. 2, namely the output from element 42 on line 48 and an output from element 44 on line 50. However, the third input to element 46, appearing on line 52, is $\bar{A}$. By substituting the values for the control signals as listed in the table of FIG. 6 and as shown in the array of FIG. 3, in the general Equation (6) above and by use of truth tables in a manner similar to that described relative to FIG. 1 and as shown below, it can be seen that under the specified conditions the array output signal will be the desired Boolean logical function of $\bar{A}+\bar{B}$.

$$f_{12} = \overbrace{(A \# 1 \# B)}^{a} \# \bar{A} \# \overbrace{(\bar{A} \# 1 \# \bar{B})}^{b} \qquad (7)$$

Truth Table 4

| B \ A | 0 | 1 |
|---|---|---|
| 0 | b 1 / a 0 | b 1 / a 1 |
| 1 | b 1 / a 1 | b 0 / a 1 |

$$a \equiv A + B$$
$$b \equiv \bar{A} + \bar{B}$$

Substituting in (7), $$f_{12} = (A+B) \# \bar{A} \# (\bar{A}+\bar{B}) \qquad (8)$$

Truth Table 5

| B \ A | 0 | 1 |
|---|---|---|
| 0 | 1 | 1 |
| 1 | 1 | 0 |

$$f_{12} = \bar{A} + \bar{B}$$

Referring now to FIG. 4, there is shown the electrical schematic of a circuit that can be utilized to perform the majority-decision logic operation of each of the elements shown in FIGS. 1, 2 and 3. The common emitter PNP transistor 56 is normally in the non-conductive state so that the voltage level appearing at the output terminals, collectively shown as 58, which are connected to the transistor collector is at some negative potential. The resistance value in the base circuit is selected in relation to the input signals applied thereto such that the transistor will be switched to the conduction state only when at least two of the input signals applied to the three input terminals, shown collectively as 60, are of a predetermined negative potential. As regards typical values and orders of magnitude, the input resistors $R_1$, $R_2$, and $R_3$, are preferably in the range of about 500 ohms, $R_4$ is preferably the range of about 50 ohms, and the load resistor $R_L$ is preferably in the range of about 400 ohms. The value of $V_1$ is in the range of about −4 volts, and the $V_2$ is in the range of about −2 volts to clamp the output signal potential at −2 volts. When the transistor 56 is driven to the conducting state the output signal at the output terminal 58 is substantially at zero or ground potential.

In the use of the circuit of FIG. 4 as the majority-decision logic circuit it can be seen that if it is arbitrarily designated that a relatively negative signal represents a binary 1 and a relatively positive signal (such as a ground or zero potential) represents a binary 0, if at least two binary 1 representing signals are applied to respective ones of the input terminals 60, the transistor 56 will conduct and there will appear a zero potential signal at the output terminals 58. If the majority of the input signals, i.e., at least two of the three, are signal representations of binary 0's, the transistor 56 will be in the nonconducting state and will output a signal of a potential level clamped at the value of $-V_2$ which, in the present example, is −2V. It should be noted at this juncture that the circuit of FIG. 4 effects an inversion of the majority of the input signals so that if the majority of inputs are binary 1's, the output indication is a binary 0, under the arbitrarily selected designations stated above. As long as this single inversion is recognized, various means can be adopted to ensure that no operational difficulty arises as a result thereof. These will subsequently be described in greater detail.

Figure 5:
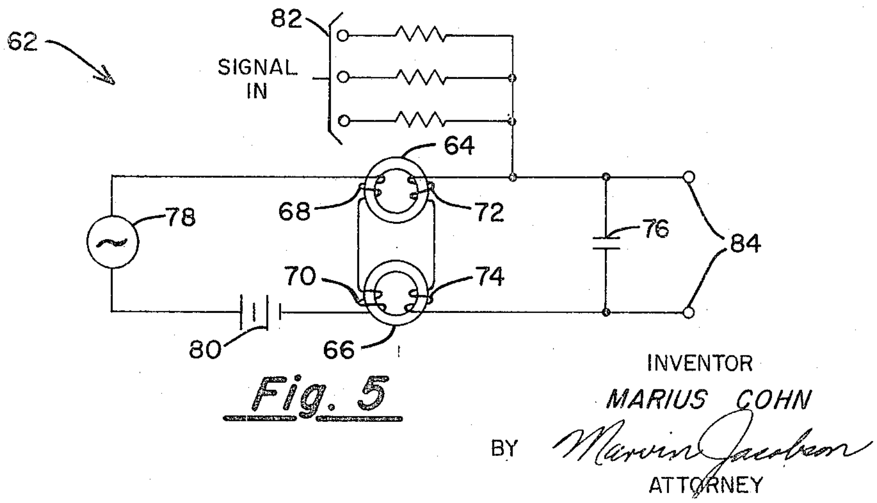
FIG. 5 is the electrical schematic of another majority-decision logic circuit which is also utilizable in the instant invention.

Another circuit which is utilizable to perform the majority-decision logic of the elements of FIGS. 1, 2 and 3 is shown in FIG. 5, which includes a parametric oscillator generally designated as 62, which in turn includes a pair of laminated or ferrite cores 64 and 66. Windings 68, 70, 72 and 74 for the cores are disposed as illustrated in the drawings. Windings 68 and 70 respectively on cores 64 and 66 are in series and in phase, while windings 72 and 74 for said respective cores are counterwound to couple signals to the cores which are out of phase. Windings 72 and 74 along with a capacitor 76 comprise a resonant circuit having a normal resonant circuit frequency *w*. With windings 72 and 74 arranged in counter phase relationship, a system balance is maintained which avoids direct coupling of the initial exciting current to the resonance current. A source, 78, of excitation current having a normal frequency 2*w*, and a direct current source such as the battery 80 is provided in order to operate the cores 64 and 66 at a point of permeability which provides a maximum variation of the magnetization of the cores relative to the level of the excitation current source. When the excitation current at frequency 2*w* is supplied to the windings 68 and 70, the resonant circuit including windings 72 and 74 and capacitor 76 oscillates in a subharmonic frequency of the order of one-half of the excitation frequency, this frequency being conveniently designated *w*. The initial oscillation which is provided by the excitation current source 78 and direct current source 80 is of relatively low intensity, and this oscillation is of frequency *w*. The sources 78 and 80 provide what is commonly termed the "pumping current" to the parametron network. One or more signal sources are provided at the input terminals collectively designated 82, each of these signal sources having a frequency 2*w*, and being arranged to be connected to the resonant circuit. When the signal source is energized, the amplitude of current in the resonant circuit increases rapidly until an upper limit is reached, and from this point on the oscillation is maintained in a stable level. The phase of the oscillation appearing in the resonant circuit is either at a certain given phase representative of a binary 1 or at a phase which is shifted by $\pi$ radians, this phase representing a binary 0. The phase of oscillation cannot be other than one of the two stated above. It will be appreciated, of course, that a single core parametron may be suitably utilized in place of the dual core network shown and described herein. Thin film cores may also be advantageously utilized.

Applying this arrangement to the majority-decision system, a binary 1 will be represented in the phase of the output which appears at terminals 84 only when a majority of the input signals represent a binary 1. In this apparatus two or more of the input signals must represent a binary 1 in order to have the equivalent output. In the same fashion, a signal representing a binary 0 will occur in the output only when the majority of the input signals to the parametron network represent a binary 0.

As stated above, if a particular circuit utilized to perform the majority-decision logic results in an inversion of the input signals, such as the circuit of FIG. 4, means may be readily adopted to ensure against operational problems. The most obvious means, of course, is to include with the circuit of FIG. 4 a second stage to perform a second inversion to thereby place the output signal to the same potential level arbitrarily designated as binary 1's and 0's. Another and more preferable method which does not require additional hardware, as would be the case with double inversion, is to alternately designate the 0 and 1 signal representations oppositely for each level of logic in the array. This can be most clearly pointed out in relation to one of the arrays such as that shown in FIG. 1. In accordance with the preceding statement, if a signal representation of binary 1 applied to the inputs of the first set of elements, 10, 12, 14, and 16, which performs the first level of logic in the array of FIG. 1 is arbitrarily designated as a relatively negative potential signal and a signal representation of a binary 0 is designated as a relatively positive or zero potential level signal, the signal inputs to the second set of elements, 18 and 20, which performs the second level of logic would be designated oppositely, that is, a binary 1 signal representation would be a relatively positive or zero potential signal while a binary 0 signal representation would be a relatively negative potential signal. The next set of logic elements in the array which performs the final level of logic, element 22 in FIG. 1, would have its signal representations the same as those applicable to the input signals to the first set of elements, namely a binary 1 represented by a relatively negative potential signal and a binary 0 represented by a relatively positive or zero potential. Because of the single inversion of element 22, the output therefrom appearing on line 40 would represent a binary 1 if in the relatively positive potential level and a binary 0 if in the relatively negative potential level. In the instance of arrays similar to FIG. 2 and 3 in accordance with the above, the output signals therefrom appearing on lines 54 will have the same binary value signal representations as the inputs of A, B, $X_1$ and $X_3$ since only two sets of elements for performing two levels of logic are utilized. It is therefore seen that the embodiments of this invention previously described are capable of performing the logical operations desired to output selectively the proper Boolean logic function signals and the proper signal representations to be utilized in the arrays will be dependent upon the particular circuitry.

Referring now to FIG. 7, there is shown three interconnected majority-decision logic arrays 86, 88 and 90 which are interconnected in a manner to form part of a binary data processing device, for example, as utilizable in a binary translator. Each of the arrays represented by a box symbol could be the circuit of FIG. 1, as labeled, although no limitation thereto is intended since a similar interconnection of arrays of FIG. 2 or combinations of arrays of FIG. 1 and FIG. 2 could be implemented. The independent variable logic inputs to array 86 are designated A and B, while those of array 88 are designated as A′, B′. The respectively corresponding selectively settable control signals are labeled $X_1—X_4$ as a group input to array 86 and $X_1'—X_4'$ as a group input to array 88. The logic inputs to array 90 are the respective outputs from arrays 86 and 88 labeled $f_{(A,B)}$ and $f'_{(A',B')}$ while the selectively settable control signals are shown as a group labeled $X_1''—X_4''$. Depending on the desired Boolean function output signal from array 90, generally labeled $f''_{(A,B,A',B')}$, the control signal for each of the arrays is selected in a manner previously described in accordance with the listings of the table of FIG. 6. Obviously, the interconnections shown in FIG. 7 are intended only to point out one very limited possibility of interconnection for data processing devices and it is recognized that a large number of possible variations are available within contemplation under the teachings of the instant invention.

At first glance, since it would appear that it is possible to obtain an array output signal representation of any one of the sixteen Boolean logical functions from the three element array of FIG. 2 that this would preclude the desirability of use of the more complex seven element array of FIG. 1. The distinguishing feature between the two arrays is that the array of FIG. 1 is a general purpose array in which the control signals can be selectively altered to provide any one of the sixteen possible Boolean function output signal representations, whereas in the array of FIG. 2 since in all but two of the cases listed in the table of FIG. 6 at least one of the control signals is a function of the independent variable input signals the possible logical function output signals under given conditions of control signals are limited. For example, in referring to FIG. 3, which provides the output signal of $\overline{A}+\overline{B}$, the control signal on line 52 which is labeled $X_2$ in the general configuration of FIG. 2 must provide a signal representation of $\overline{A}$ as an input to logical element 46. Referring again to the table of FIG. 6, it can be seen that with $X_2$ set to the $\overline{A}$ signal representation there are only four of the sixteen possible Boolean function output signals that could be selectively obtained from the array. These would correspond to *n*3, *n*4, *n*11 and *n*12.

It is further recognized that most if not all of the combinations of signals for FIG. 2 to effect the corresponding Boolean logical function output signals can be achieved at least as efficiently utilizing the well-known AND-OR logic circuits. However, the array of FIG. 2 does provide a logic array utilizing majority-decision logic circuits which can be utilized in conjunction with other majority-decision logic circuit arrays, such as the general purpose one shown in FIG. 1, in the formation of circuits for data processing devices whereas the well-known AND-OR logic circuits would not be readily or efficiently adapted for use in combination with majority-decision logic circuits.

It is understood that suitable modification may be made in the structure as disclosed provided such modifications come within the spirit and scope of the appended claims. Having now, therefore, fully illustrated and described our invention, what we claim to be new and desire to protect under Letters Patent is:

What is claimed is:

1. A function generator, for generating a signal representative of any one of the sixteen Boolean functions of two independent variables A and B, comprising:

a first logic level of four majority logic elements for generating four output signals comprising;

input means for receiving signal representations of independent variables A and B and function selection signals $X_1$, $X_2$, $X_3$ and $X_4$, a first majority logic element coupled to said input means for utilizing signal representations of A, B, and $X_1$ to generate a first output signal, a second majority logic element coupled to said input means for utilizing signal representations of $\overline{A}$, B, and $X_2$ to generate a second output signal, a third majority logic element coupled to said input means for utilizing signal representations of A, $\overline{B}$, and $X_3$ to generate a third output signal, and a fourth majority logic element coupled to said input means for utilizing signal representations of $\overline{A}$, $\overline{B}$, and $X_4$ to generate a fourth output signal, a second logic level of two majority logic elements for generating two output signals comprising;

input means for receiving the four output signals generated by said first logic level and a signal representation of a binary zero, a first majority logic element coupled to said input means for utilizing said first and second output signals generated by said first logic level and a signal representative of a binary zero to generate a first output signal, and a second majority logic element coupled to said input means for utilizing said third and fourth output signals generated by said first logic level and a signal representative of a binary zero to generate a second output signal, a third logic level of one majority logic element for generating a signal representative of a Boolean function comprising;

input means for receicving the two output signals generated by said second logic level and a signal representative of a binary one, and a majority logic element coupled to said input means for utilizing said output signals generated by said second logic level and a signal representative of a binary one to generate a signal representative of a Boolean function.

2. A function generator, for generating a signal representative of a Boolean function of two independent variables A and B, comprising:

a first logic level of two majority logic elements for generating two output signals comprising;

input means for receiving signal representations of independent variables A and B and function selection signal $X_1$, a first majority logic element coupled to said input means for utilizing signal representations of A, B, and $X_1$ to generate a first output signal, and a second majority logic element coupled to said input means for utilizing signal representations of $\overline{A}$, $\overline{B}$, and $X_1$ to generate a second output signal, a second logic level of one majority logic element for generating a signal representative of a Boolean function comprising;

input means for receiving the two output signals generated by said first logic level and function selection signal $X_2$, and a majority logic element coupled to said input means for utilizing said output signals generated by said first logic level and function selection signal $X_2$ to generate a signal representative of a Boolean function.

References Cited by the Examiner

UNITED STATES PATENTS

| | | | |
|---|---|---|---|
| 2,999,637 | 9/1961 | Curry | 235—176 |
| 3,201,574 | 8/1965 | Szekely | 235—175 |

OTHER REFERENCES

"Axiomatic Majority-Decision Logic," by Cohn and Lindaman in I.R.E. Transactions on Electronic Computers, March 1961, page 17.

Publication I: Arithmetic Operations in Digital Computers, by R. K. Richards, particularly chapters 2, 3 and 4. Copyright 1955.

"Connective Register Using Majority Logic," Smith and Verma, IBM Technical Disclosure Bulletin, vol. 6, No. 4. September 1963.

MALCOLM A. MORRISON, *Primary Examiner.*

ROBERT C. BAILEY, IRVING SRAGOW, *Examiners.*

I. FAIBISCH, R. J. McCLOSKEY, M. J. SPIVAK, *Assistant Examiners.*